US006634169B1

(12) United States Patent
Andersen et al.

(10) Patent No.: US 6,634,169 B1
(45) Date of Patent: Oct. 21, 2003

(54) METHOD AND SYSTEM FOR MAINTAINING EFFICIENCY OF A THREE-WAY CATALYST

(75) Inventors: Paul Joseph Andersen, Norristown, PA (US); Todd Howard Ballinger, Audubon, PA (US); David Scott Lafyatis, Frazer, PA (US); Raj Rao Rajaram, Slough (GB); Andrew Peter Walker, Wallingford (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 09/486,486

(22) PCT Filed: Aug. 19, 1998

(86) PCT No.: PCT/GB98/02483

§ 371 (c)(1),
(2), (4) Date: Jun. 5, 2000

(87) PCT Pub. No.: WO99/11910

PCT Pub. Date: Mar. 11, 1999

(30) Foreign Application Priority Data

Aug. 28, 1997 (GB) .............................. 9718059

(51) Int. Cl.$^7$ ................................. F01N 3/00
(52) U.S. Cl. ........................ 60/285; 60/274; 60/284; 60/289
(58) Field of Search ................ 60/284, 285, 286, 60/289, 295, 300, 302, 278, 274, 277; 502/304

(56) References Cited

U.S. PATENT DOCUMENTS

| 3,943,709 A | * | 3/1976 | Holt ........................... 60/284 |
| 4,148,188 A | * | 4/1979 | Tokura ........................ 60/285 |
| 4,476,246 A | * | 10/1984 | Kim et al. .................... 502/304 |
| 5,271,223 A | * | 12/1993 | Hoshi .......................... 60/285 |
| 5,318,757 A | * | 6/1994 | Abe et al. ..................... 60/300 |
| 5,357,752 A | * | 10/1994 | Lucchesi ...................... 60/300 |
| 5,402,641 A | * | 4/1995 | Katoh et al. ................... 60/285 |
| 5,425,233 A | * | 6/1995 | Ma et al. ...................... 60/289 |
| 5,519,992 A | * | 5/1996 | Hosoya et al. ................. 60/289 |
| 5,655,363 A | * | 8/1997 | Ito et al. ...................... 60/277 |
| 5,657,625 A | * | 8/1997 | Koga et al. ................... 60/285 |
| 5,722,236 A | * | 3/1998 | Cullen et al. .................. 60/289 |
| 5,724,808 A | * | 3/1998 | Ito et al. ...................... 60/285 |
| 5,746,049 A | * | 5/1998 | Cullen et al. .................. 60/289 |
| 5,802,845 A | * | 9/1998 | Abe et al. ..................... 60/289 |
| 5,832,722 A | * | 11/1998 | Cullen et al. .................. 60/297 |
| 5,878,567 A | * | 3/1999 | Adamczyk, Jr. et al. ....... 60/284 |
| 6,116,208 A | * | 9/2000 | Nishimura et al. ........... 60/278 |

FOREIGN PATENT DOCUMENTS

| DE | 195 22 165 | 12/1995 |
| EP | 0 580 389 | 1/1994 |
| EP | 0 747 581 | 12/1996 |
| JP | 56-148608 | * 11/1981 |
| JP | 63-45449 | * 2/1988 |
| JP | 63 150441 | 6/1988 |
| JP | 41 61251 | 4/1992 |
| JP | 6066129 | * 3/1994 |
| JP | 08 093456 | 4/1996 |
| WO | WO 96/39576 | 12/1996 |

OTHER PUBLICATIONS

British Search Report, dated Nov. 18, 1997.
International Search Report, dated Nov. 16, 1998.

* cited by examiner

Primary Examiner—Thomas Denion
Assistant Examiner—Tu M. Nguyen
(74) Attorney, Agent, or Firm—RatnerPrestia

(57) ABSTRACT

A catalyst system includes a three-way catalyst (TWC) mounted underfloor and an engine management system programmed to initiate an enrichment of the exhaust gases exiting the engine with at least one of CO and hydrocarbons and to add secondary air to the exhaust gases in the exhaust passage upstream of the TWC. This periodic enrichment and addition of secondary air causes catalytic oxidation of the at least one of CO and hydrocarbons over the TWC thereby raising the underfloor TWC temperature to at least 550° C., preferably higher, in order to reduce sulphur poisoning of the catalyst and maintain the desired catalytic activity.

8 Claims, 2 Drawing Sheets

METHOD AND SYSTEM FOR MAINTAINING EFFICIENCY OF A THREE-WAY CATALYST

Figure 1:
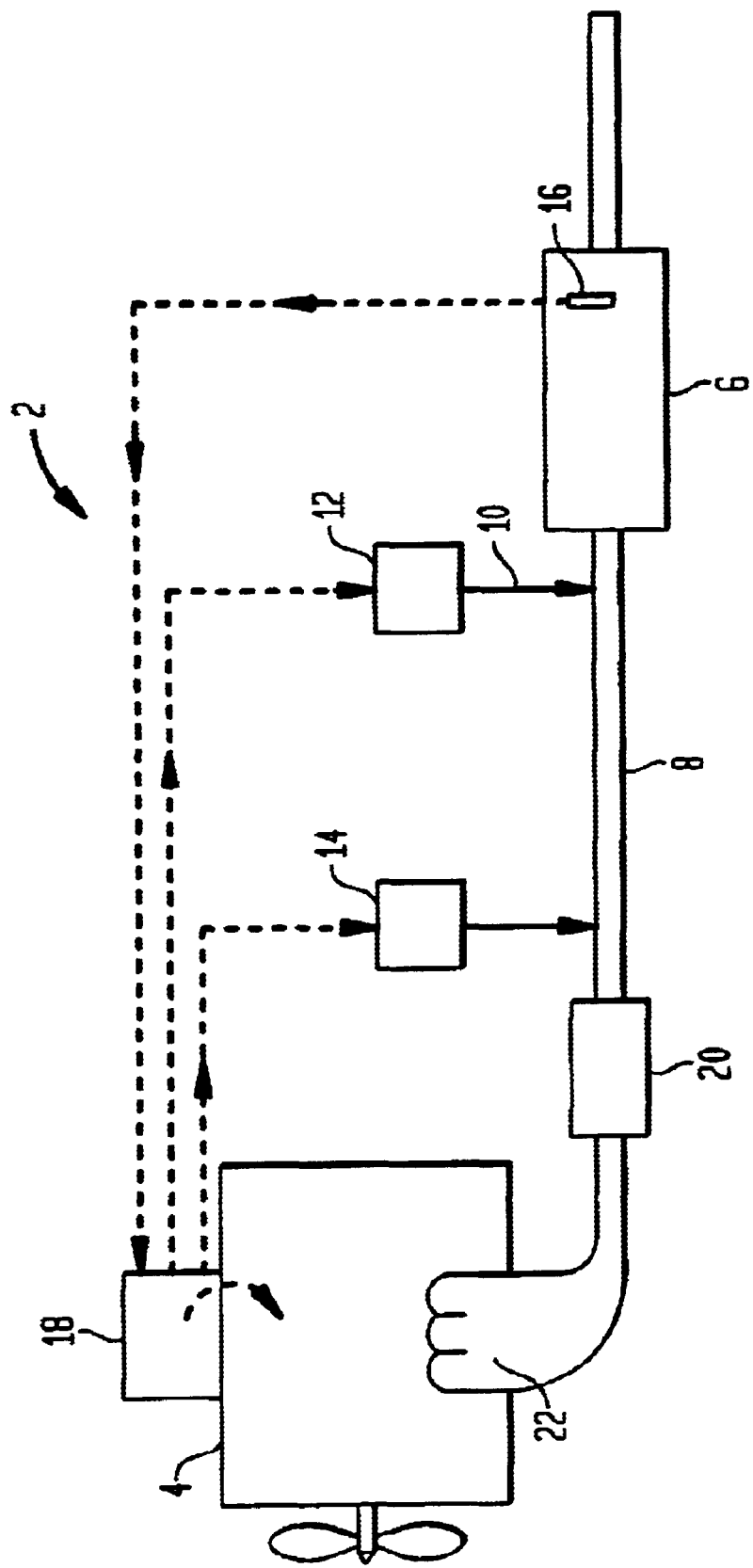

This application is the U.S. national-phase application of PCT International Application No. PCT/GB98/02408.

This invention concerns improvements relating to catalysts more especially it concerns improvements in automobile emission catalysts.

The use of such catalysts, also known as catalytic converters, is very well established in the automobile industry in view of the exhaust gas emission regulations which are in force in most countries. The most common catalysts use a platinum group metal ("PGM") especially one or more of Pt, Pd and Rh, carried on an oxidic high surface area washcoat which is one or more of $Al_2O_3$, $CeO_2$, $ZrO_2$ including mixed oxides thereof or the like. The support for the catalyst is generally a low pressure-drop flow-through honeycomb manufactured from an extruded ceramic, eg cordierite, or from a metal honeycomb.

Gasoline contains varying amounts of sulphur depending upon its origins and the amount and type of refining it has been subjected to. Sulphur is a well-known poison of catalyst activity in such catalysts. We believe that the deactivating effect of sulphur may be due to adsorption on either the precious metal or on the support. We have found that sulphur may be removed by increasing the temperature of the catalyst, but that under lean operating conditions, that is when the overall composition of the exhaust gases leaving the engine is oxidising, the temperature required for sulphur removal is higher than under rich conditions. Indeed, we have found that for certain catalysts, the minimum temperature for sulphur removal is 625° C. under lean conditions. This temperature is higher than the catalyst would normally be exposed to in its usual under-floor position mounted on the automobile.

EP 580389 (Toyota) discloses the removal of SOx from a NOx absorbent-type catalyst which is used to treat the exhaust gases from a lean-burn gasoline internal combustion engine, by decreasing the oxygen concentration in the exhaust gases, thus making them rich. That is, SOx is being removed from the NOx absorbent by chemical means. JP 4161251 (Mitsubishi) teaches the removal of SOx from a catalyst for a lean burn internal combustion engine such as a diesel engine, by heating the catalyst to 450–800° C. It is plain from the drawings that significant heating is required (600° C. for 1 hour) in order approximately the S-free conversion. Heating at 500° C. for 2 hours did not give to return to approximately the S-free conversion. Heating at 500° for 2 hours did not give such good results. Most diesel fuels have a much higher S content than gasolines.

According to one aspect, the invention provides a system comprising a gasoline-fuelled internal combustion engine, which engine operates substantially under stoichiometric conditions during normal operation, a three-way catalyst (TWC) mounted under-floor and arranged in an exhaust passage to have exhaust gas passed continuously therethrough, and an engine management system, wherein the engine management system is programmed to initiate a condition of the system in which the engine exhaust gases are enriched with at least one of CO and hydrocarbons; and secondary air is added to the engine exhaust gases in the exhaust passage upstream of the underfloor TWC to make the exhaust gas leaner over the underfloor TWC than the exhaust gas exiting the engine and to cause an exotherm by oxidation of the at least one of CO and hydrocarbons over the underfloor TWC thereby to raise the underfloor TWC temperature to at least 550° C., whereby sulphur poisoning of the catalyst is reduced, during at least one portion of every operation of the engine.

According to a further aspect, the invention provides a method of reducing sulphur poisoning of a three-way catalyst (TWC) in the exhaust system of a gasoline-fuelled internal combustion engine, which method comprises operating the engine at substantially stoichiometric conditions during normal operation; intermittently enriching the exhaust gases exiting the engine with at least one of CO and hydrocarbons; and adding supplementary air to the exhaust gases upstream of the TWC to make them leaner than the exhaust gas exiting the engine thereby to cause catalytic oxidation of the at least one of CO and hydrocarbons to cause heating of the TWC, thereby to raise the temperature of the TWC to at least 550° C., preferably at least 600° C., whilst continuously passing exhaust gas therethrough, provided that said intermittent enrichment and air addition takes place at least once every engine operation.

The internal combustion engine and its associated controls may be desirably designed in a preferred embodiment to operate essentially under stoichiometric conditions during normal operation.

A preferred catalyst for use in this preferred embodiment incorporates palladium and ceria. A more preferred catalyst is one having ambient temperature CO oxidation activity, as described in our prior patent applications WO 96/39576 and EP 0747581.

The preferred embodiment of the present invention may be operated in several different ways. In a first method, especially when using the preferred catalysts, the engine management system provides a very rich cold start. Oxidation of CO and unburnt hydrocarbon species (using a secondary air supply) on the catalyst immediately begins to raise the catalyst temperature to a temperature at which sulphur removal under lean conditions takes place, that is preferably above 625° C. More preferably, the rich cold start is continued to bring the catalyst to a temperature of 800–850° C. or higher, in order to remove virtually all sulphur species from the catalyst.

A second method, which may be combined with the first, utilises a periodic enrichment to, for example, an air/fuel ratio of 10–14 for a pre-set time, for example 5–100 seconds, during normal running, combined with secondary air addition. The catalyst will already be at a normal operating temperature of at least 400° C. and therefore does not require as much chemical energy to raise its temperature to an effective sulphur-removal temperature as does the first embodiment which begins at ambient temperature. In such a second method, the period between initiations of the high temperature may be pre-set in the engine management system memory, or may be variable according to operating conditions and/or either the sulphur content of the fuel, eg as sensed, or some form of feed-back of sulphidation of the catalyst.

A modification of this second method arises in a preferred design in which the said catalyst is supplemented by another catalyst, preferably in a close-coupled position close to the engine. The close-coupled catalyst is mounted upstream of the secondary air inlet. This offers particular benefits in that during the high temperature phase, NOx reduction on the main catalyst is less effective (because of the lean condition due to secondary air addition), but the close-coupled catalyst, which is exposed to the enriched engine-out condition, can still provide NOx removal.

A third method involves removal of sulphur under rich conditions, which may be achieved at a lower catalyst temperature than when the exhaust gas is stoichiometric or lean. The normal operating temperature of the catalyst is still generally below that at which sulphur may be removed. It is therefore again necessary to raise the catalyst temperature which may be done by enrichment, either on start-up or periodically during operation, by adjusting the air-fuel ratio fed to the engine or by supplementary fuel addition into the exhaust gas stream. Supplementary air addition provides the conditions for exothermic oxidation on the catalyst raising its temperature to or above the required level. Once the required temperature has been reached, suitably at least 550° C., preferably at least 650° C., the supplementary air may be terminated or reduced, so that the exhaust gases are rich, that is there is an excess of reducing species.

It will be appreciated that the actual conditions, time periods and other parameters relevant to sulphur removal depend upon the engine and emission system design and general operating conditions, as well as the results desired, and may be determined by conventional optimisation.

The preferred embodiment of the invention is believed to offer particular advantages with the preferred catalysts mentioned above, and permits the maintenance of low temperature light-off capability.

One or more sensors 16 for sensing the level of sulphation of the underfloor TWC 6 by feedback to an engine management system 18 can be provided to enable more accurate control of catalyst de-sulphation processes. The engine management system 18 is in operable communication (represented by dashed lines), with e.g. the air-fuel ratio control means (not shown) of the engine 4, the secondary air supply means 12 and, where present, the exhaust gas passage fuel injection means 14. The engine management system 18 is pre-programmed whereby, in use, it initiates and controls a condition of the system 2 in which exhaust gases in the exhaust passage 8 are enriched with at least one of CO and hydrocarbons and secondary air is injected into the exhaust passage 8 upstream of the underfloor TWC 6. The increased amounts of at least one of hydrocarbons and CO are oxidised in the additional oxygen over the underfloor TWC 6 creating an exotherm thereby raising the underfloor TWC 6 temperature to at least 550° C. Raising the temperature of the underfloor TWC 6 reduces sulphur poisoning of the catalyst during at least one portion of every operation of the engine 4.

The at least one of CO and hydrocarbon enrichment in the exhaust gas can be provided by adjusting the air to fuel ration from the stoichiometric ratio to a richer mixture, e.g. from 10–14 or richer. This can be done immediately after cold start, preferably raising the temperature of the underfloor TWC 6 above 625° C., most preferably from 800–850° C., in order to remove virtually all sulphur species from the underfloor TWC 6.

The invention will now be described by way of example only.

1. Preparation of Pd/CeO$_2$ Catalyst

Commercially available CeO$_2$ particles were impregnated using tetraammine palladium hydrogen carbonate solution so that the PGM content was 8% Pd by weight. This was then coated onto a 400 cells per square inch (62 cells/cm$^2$) monolith at a loading of 3g/in$^3$ (0.18g/cm$^3$).

2. Experimental Evaluation Protocols

In order to test catalysts on a micro reactor, the following evaluation procedures were adopted.

Test 1 Protocol

Figure 2:
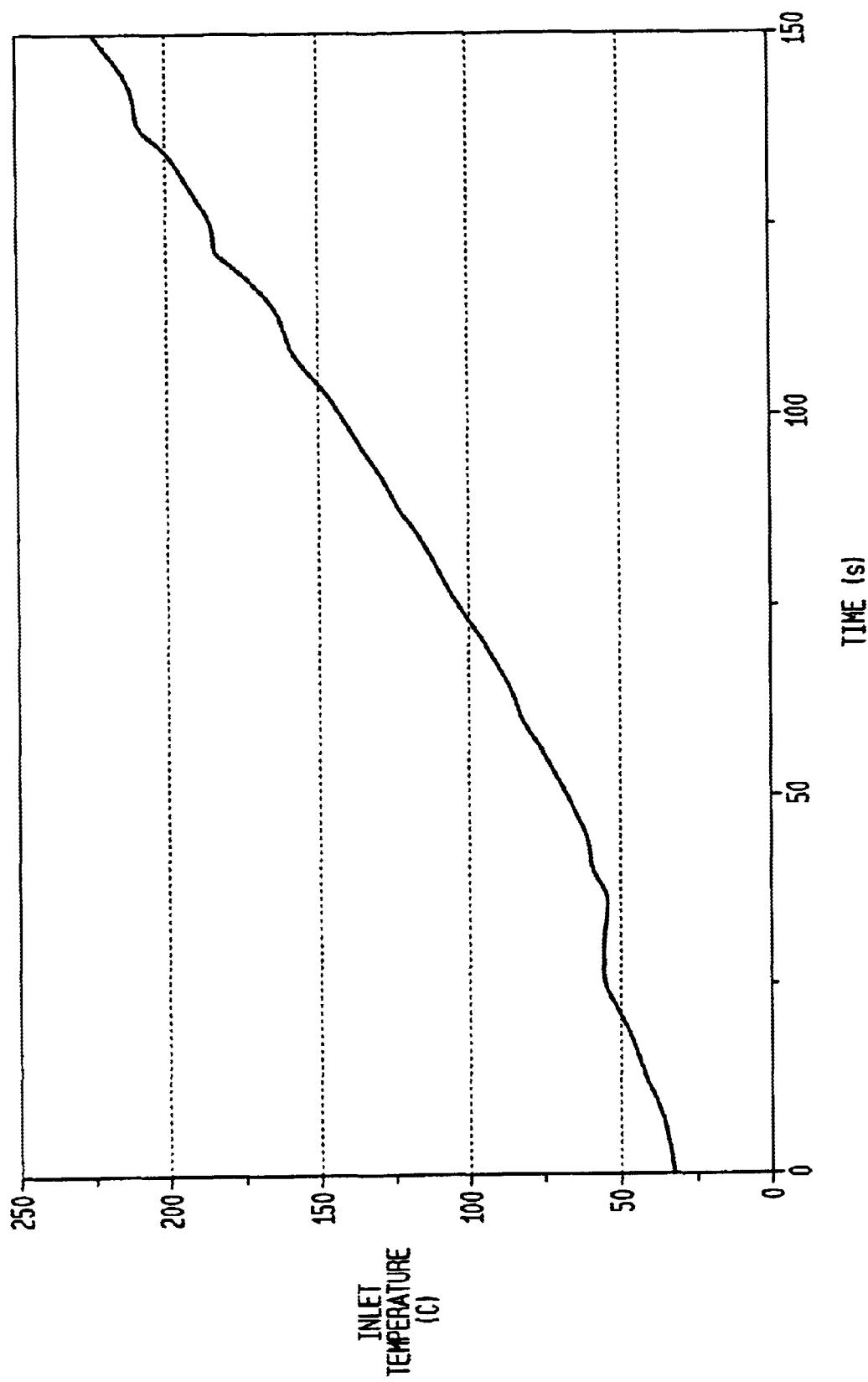

Prior to experiment, the catalyst is heated to 425° C. in a stream of argon with 5% O$_2$. The catalyst is then cooled to ambient temperature in this stream. Temperature ramp at the catalyst inlet starts at time=0 from ambient temperature, as shown in FIG. 2. At time=0, the following species are also fed to the reactor (GHSV=30,000);

500ppm NO
600ppm C$_3$H$_6$
15% CO$_2$
10% H$_2$O
4% CO

Evaluation is performed by measuring the average CO conversion during the first 20 seconds of the experiment (while the catalyst inlet temperature is still below 50° C.).

Test 2 Protocol

Prior to experiment, the catalyst is heated to 425° C. in a stream of argon with 5% O2. The catalyst is then cooled to ambient temperature in this stream. Temperature ramp at the catalyst inlet starts at time=0 from ambient temperatures, as shown in FIG. 2. At time=0, the following species are also fed to the reactor (GHSV=30,000)

15% CO$_2$
4% CO

Evaluation is performed by measuring the average CO conversion during the first 20 seconds of the experiment (while the catalyst inlet temperature is still below 50° C.).

This test protocol is somewhat less stringent than the Test 1 protocol, because there are fewer inhibiting species present in the feed.

For a series of further tests catalysts were aged by exposure to a variety of gases and conditions. The gas concentrations for tests 1A to 1E are specified in the Table below, the balance being N$_2$, under the conditions specified below for the various tests.

| Test | C$_3$H$_6$ | NOx | SO$_2$ | O$_2$ | CO$_2$ | CO |
|---|---|---|---|---|---|---|
| 1A | 600 ppm | 500 ppm | 0 ppm | 4% | 15% | 1.5% |
| 1B | 600 ppm | 500 ppm | 5 ppm | 4% | 15% | 1.5% |
| 1C | 600 ppm | 500 ppm | 5 ppm | 11% | 15% | 8.5% |
| 1D | 600 ppm | 500 ppm | 5 ppm | 11% | 15% | 9%/1.5% cycles |
| 1E | 600 ppm | 500 ppm | 5 ppm | 11% | 15% | 9%/1.5% cycles |

3. Examples 1A, 1B and 1C

Steady-state Ageing Condition

Three identical catalyst samples were aged in a micro-reactor under lean conditions in feeds containing CO, O$_2$, CO$_2$, C$_3$H$_6$, NO at a GHSV of 100,000 and at a catalyst inlet temperature of 350° C. for 14 hours. In Example 1A, the feed contained 1.5% CO and 4% O$_2$, and the temperature measured in the catalyst bed was 435° C.

In Example 1B, the feed contained 1.5% CO, 4% O$_2$ and 5ppm SO$_2$, and the temperature measured in the catalyst bed was 435° C.

In Example 1C, the feed contained 8.5% CO. 11% O$_2$ and 5ppm SO$_2$, and the temperature measured in the catalyst bed was 860° C.

Table 1 shows the resulting catalyst performance following these steady-state ageing conditions.

TABLE 1

| Sample (ageing conditions) | % CO Conversion Protocol I | % CO Conversion Protocol 2 |
|---|---|---|
| 1A (low temperature, no $SO_2$) | 97% | not tested |
| 1B (low temperature, with $SO_2$) | not tested | 0% |
| 1C (high temperature, with $SO_2$) | 86% | not tested |

As can be seen from these results, low temperature ageing in the absence of $SO_2$ (Sample 1A) leaves a catalyst with excellent levels of low temperature CO oxidation activity in the stringent test protocol 1. However, the addition of sulphur to the feed during this low temperature ageing (sample 1B) completely removes all of this low temperature activity. This is caused by sulphur poisoning of the active sites. The deleterious effect of sulphur on the catalyst activity is negated, however, when the ageing is performed at elevated temperature (as in sample 1C). This is because the sulphur does not adsorb onto the catalyst under these conditions.

4. Examples 1D and 1E Cycled Ageing Condition

The above Example shows that by keeping the catalyst continually hot (>800° C.) under normal lean operation the catalyst can maintain its excellent low temperature activity. However, under real driving conditions it may be more practical (ie fuel efficient) to expose the catalyst to high temperature conditions only on a periodic basis.

Two more catalysts were aged in the micro reactor under lean conditions in feeds containing CO, $O_2$, $CO_2$, $C_3H_6$, NO and 5ppm $SO_2$ at a GHSV of 100,000 and at a catalyst inlet temperature of 350° C. for 14 hours. In both ageings, the oxygen concentration was held at 11%.

In Example D: the catalyst was aged under cyclic conditions with a 300-second period;
100 seconds: 9% CO, bed temperature≈880° C.;
200 seconds: 1.5% CO, bed temperature≈420° C.;
In Example 1E: the catalyst was aged under cyclic conditions with a 1000-second period;
100 seconds: 9% CO, bed temperature≈800° C.;
900 seconds: 1.5% CO, bed temperature≈430° C.

Table 2 shows the evaluation results following these cycled ageing conditions.

TABLE 2

| Sample | % CO Conversion Protocol 1 | % CO Conversion Protocol 2 |
|---|---|---|
| 1D | 71% | 91% |
| 1E | 38% | 62% |

Table 2 shows that high levels of low temperature CO activity are retained by the catalysts following such a cycled ageing protocol. It is also worth noting that using mass spectrometry, $SO_2$ was identified leaving the catalyst during the high temperature portions of these cycles. Thus, such a cycled ageing protocol may be used to deliberately remove sulphur and enhance the activity of such catalysts.

What is claimed is:

1. A system comprising:
    a gasoline-fuelled internal combustion engine, wherein the engine operates at substantially stoichiometric conditions during normal operation;
    a three-way catalyst (TWC) mounted under-floor and arranged in an exhaust passage to have exhaust gases passed continuously therethrough; and
    an engine management system, wherein the engine management system is programmed to initiate a condition of the system in which the engine exhaust gases are enriched with at least one of CO and hydrocarbons during cold start when the engine is operated under rich conditions and under any driving conditions, and secondary air is added to the engine exhaust gases in the exhaust passage upstream of the underfloor TWC to provide lean conditions over the underfloor TWC lean and to cause an exotherm by oxidation of the at least one of CO and hydrocarbons over the underfloor TWC thereby to raise the temperature of the underfloor TWC to at least 550° C., whereby sulphur poisoning of the underfloor TWC is reduced, during at least one portion of every operation of the engine.

2. A system according to claim 1, wherein the underfloor TWC comprises palladium and ceria.

3. A system according to claim 1 or 2, further comprising an additional TWC close-coupled to the engine and upstream of a point of secondary air addition.

4. A system according to claim 1, wherein sufficient secondary air is added to provide lean conditions over the underfloor TWC.

5. A method of reducing sulphur poisoning of a three-way catalyst (TWC) in an exhaust system of a gasoline-fuelled internal combustion engine, comprising the steps of:
    operating the engine at substantially stoichiometric conditions during normal operation;
    intermittently enriching the exhaust gases exiting the engine with at least one of CO and hydrocarbons during cold start when the engine is operated under rich conditions and under any driving conditions; and
    adding secondary air to the exhaust gases upstream of the TWC to provide lean conditions over the TWC thereby to cause catalytic oxidation of the at least one of CO and hydrocarbons to cause heating of the TWC, thereby to raise the temperature of the TWC to at least 550° C., whilst continuously passing exhaust gases therethrough, provided that the intermittent enrichment and air addition takes place at least once every engine operation.

6. A method according to claim 5, wherein heating is carried out to raise the catalyst temperature to at least 600° C.

7. A method according to claim 5, wherein the step of intermittently enriching the exhaust gases is done for a pre-set time between 5–100 seconds.

8. A method according to claim 5, wherein sufficient supplementary air is added to provide lean conditions over the TWC.

* * * * *